(12) United States Patent
Kato et al.

(10) Patent No.: US 7,116,284 B2
(45) Date of Patent: Oct. 3, 2006

(54) CONTROL APPARATUS OF VIRTUAL COMMON SPACE USING COMMUNICATION LINE

(75) Inventors: Masami Kato, Sagamihara (JP); Ken Sakakibara, Tokyo (JP); Yoshihisa Tadokoro, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 213 days.

(21) Appl. No.: 09/726,022

(22) Filed: Nov. 30, 2000

(65) Prior Publication Data
US 2001/0002831 A1 Jun. 7, 2001

(30) Foreign Application Priority Data
Dec. 2, 1999 (JP) ................................. 11-343115

(51) Int. Cl.
*G09G 5/00* (2006.01)
(52) U.S. Cl. ....................................... 345/2.1; 715/753
(58) Field of Classification Search ................ 345/753, 345/757, 758, 326, 1.1, 2.1, 2.3; 709/106, 709/100, 203, 204; 715/700, 706, 719, 750, 715/751, 753, 755, 757; 463/30, 31, 34; 700/65

See application file for complete search history.

(56) References Cited

U.S. PATENT DOCUMENTS

| | | | |
|---|---|---|---|
| 5,764,901 A * | 6/1998 | Skarbo et al. .............. | 709/204 |
| 5,918,222 A | 6/1999 | Fukui et al. ................... | 707/1 |
| 6,025,870 A * | 2/2000 | Hardy ........................ | 348/14.1 |
| 6,115,743 A * | 9/2000 | Cowan et al. .............. | 709/224 |
| 6,119,147 A * | 9/2000 | Toomey et al. ............. | 709/204 |
| 6,195,104 B1 * | 2/2001 | Lyons ........................ | 345/473 |
| 6,212,547 B1 * | 4/2001 | Ludwig et al. ............. | 709/204 |
| 6,330,022 B1 * | 12/2001 | Seligmann ................ | 348/14.08 |
| 6,349,327 B1 * | 2/2002 | Tang et al. .................. | 709/205 |
| 6,370,267 B1 * | 4/2002 | Miller et al. ................. | 382/154 |
| 6,401,123 B1 * | 6/2002 | Shields et al. .............. | 709/227 |
| 6,448,978 B1 * | 9/2002 | Salvador et al. ............ | 345/741 |

(Continued)

FOREIGN PATENT DOCUMENTS

JP 5-12023 1/1993

(Continued)

OTHER PUBLICATIONS

Y. Yokoo et al., "Human Face Detection Method Using Genetic Algorithm," Institute of Electrical Engineers of Japan Proceedings, vol. 117-C, No. 9, 1997, pp. 1245-1252.

(Continued)

*Primary Examiner*—Richard Hjerpe
*Assistant Examiner*—Abbas Abdulselam
(74) *Attorney, Agent, or Firm*—Fitzpatrick, Cella, Harper & Scinto

(57) ABSTRACT

A user terminal device has a computer, a software for the user terminal device, a telephone, a video camera and a virtual office display device. Generally, working state, condition or the like of another user is displayed on a screen of the virtual office display device. A user's state is recognized on the basis of an image of the user taken by the video camera. In a case where the user continuously looks toward the virtual office display device for a period longer than a time previously determined by the user, the screen of the virtual office display device is switched to a rest room screen, and the user is moved to a rest room in a virtual space. In that rest room, the user can communicate with another user utilizing a cooperative rest tool. The cooperative rest tool includes a voice meeting tool, a character meeting tool and a multiuser game tool.

8 Claims, 11 Drawing Sheets

U.S. PATENT DOCUMENTS 6,460,084 B1 * 10/2002 Van Horne et al. ......... 709/227
6,681,043 B1 * 1/2004 Lau et al. .................... 382/173
6,684,399 B1 * 1/2004 Grooters ...................... 725/48

FOREIGN PATENT DOCUMENTS

| JP | 07-175733 | * | 7/1995 |
| JP | 9-81632 | | 3/1997 |
| JP | 11-289524 | * | 10/1999 |

OTHER PUBLICATIONS

Suenaga, Y., "Reading Human Images—Computer Vision For Human Interface", IEICE Transactions, vol. 78, No. 8, pp. 800-804, Aug. 1995. (In Japanese).

* cited by examiner

CONTROL APPARATUS OF VIRTUAL COMMON SPACE USING COMMUNICATION LINE

BACKGROUND OF THE INVENTION

1. Field of the Invention

The present invention relates to a control apparatus for producing a virtual common space used to take a rest or the like in a TV conference, telecommuting or the like.

2. Related Background Art

Conventionally, each organization such as a company, a corporation, a public office or the like prepares an office space as a working place of employed laborers (called workers hereinafter) who are engaged in an office job, trade business, technological business not needing a large equipment. Generally, the workers arrive at the office space until the working start time utilizing public transportation, private cars or the like and work together in that office during a predetermined working time. Efficient working in various jobs has been realized by equipping a telephone, a copying machine, a fax machine, a computer, a computer network and the like in the office space.

This collective working custom is comparatively a recent phenomenon which comes into adoption for the purpose of realizing an efficient management of a factory after establishment of the Industrial Revolution in the history of mankind. Recently, harmful effects such as fatigue in a commute, atmospheric pollution due to the increase of private cars and the like depending on a collective working style have been remarkably brought. On the other hand, since the communicating infrastructure such as the Internet or the like and various communicating technology have been able to be utilized, the collective working style is not always an inevitable working style for each organization and the workers. Preferably, a dispersive working style, which is characterized in that the workers belonging to the same organization are to be telecommuted at respective homes or favorite places near the organization such that the intended business is to be collectively performed, has been gradually noticed.

Generally, in order to realize the dispersive working style in the organization such as a company or the like, one room in each worker's home is used as a working space (called home office hereinafter) and plural home offices dispersed at remote places are connected each other through a communication line so as to adopt a method of using a home communication terminal device such as a telephone, a fax machine and the like, and a communication application system, whereby necessary communication means among the workers can be kept. For example, the communication line is composed of a subscriber telephone network, an ISDN network, a line dedicated for the Internet or the like. The communication application system is constituted by an E-mail system, a WWW (World Wide Web) system, a TV conference system or the like.

The workers utilize a satellite office, a telecottage or the like provided by the belonging organization, a local government or the like besides the home office. In case of the trade business or maintenance work, a seat in a private car or the public transportation used for visiting customers is utilized as a temporary working space (mobile office).

Recently, with the advance of trial for accomplishing the business characterized in that the worker is to be telecommuted while performing the communication with other workers using the above various equipments and the communication application system, harmful effects have been brought.

As a first problem, a sense of alienation due to the decrease of informal communication has been born. For example, a booklet issued by the related agencies describes "a teleworker (home worker and satellite office worker) is sometimes in a risk of falling into a state being alienated from the information, to prevent this situation is the most important problem to be solved, and thus it is required to contrive to quickly send not only business information but other information to the teleworker".

Generally, in an ordinary office, it is considered that information other than the business information is almost casually exchanged among the workers in a rest room (refresh room) during a rest time. The above various home communication terminal devices and the communication application which realize the dispersive working style can not realize the informal communication as exchanged in the rest room, among the workers dispersed at remote places.

The decrease of the informal communication among the workers inevitably causes difficulty in sense of unity within the organization, and the workers feel the sense of isolation or alienation. This fact becomes a serious hindrance in continuing the dispersive working style for a long period.

As a second problem, in the home office, the teleworker is in a risk of falling into a state being felt the overwork comparing with ordinary workers of the collective working style. According to the above booklet, it is warned that "in case of a home working style, it must be avoided from the careless long work or the work extended to the midnight owing to an excess zeal of the worker for the work". As indicated by the documentary records other than the above booklet related to home working, since the home worker is entrusted with own decision regarding the management of working hours and choice of the rest, the home worker well understands necessity of taking the rest, and the rest can be taken in the home office. In spite of this fact, it is tended not to pay attention in taking the rest because the work is to be performed by only the single worker.

SUMMARY OF THE INVENTION

An object of the present invention is to provide a control apparatus of a virtual common space and a control method thereof for solving the above problems.

Another object of the present invention is to provide a control apparatus of a virtual common space and a method thereof capable of spending the similar rest time as compared with that in an ordinary office in a TV conference or the home working.

Still another object of the present invention is to provide a control apparatus of a virtual common space and a method thereof capable of providing an environment for keeping mental health in the TV conference or the home working.

Other objects of the present invention will become apparent from the following explanation based on the accompanying attached drawings and the appended claims.

DETAILED DESCRIPTION OF THE PREFERRED EMBODIMENTS

Hereinafter, the embodiments of the present invention will be explained in detail with reference to the accompanying drawings.

Figure 1:
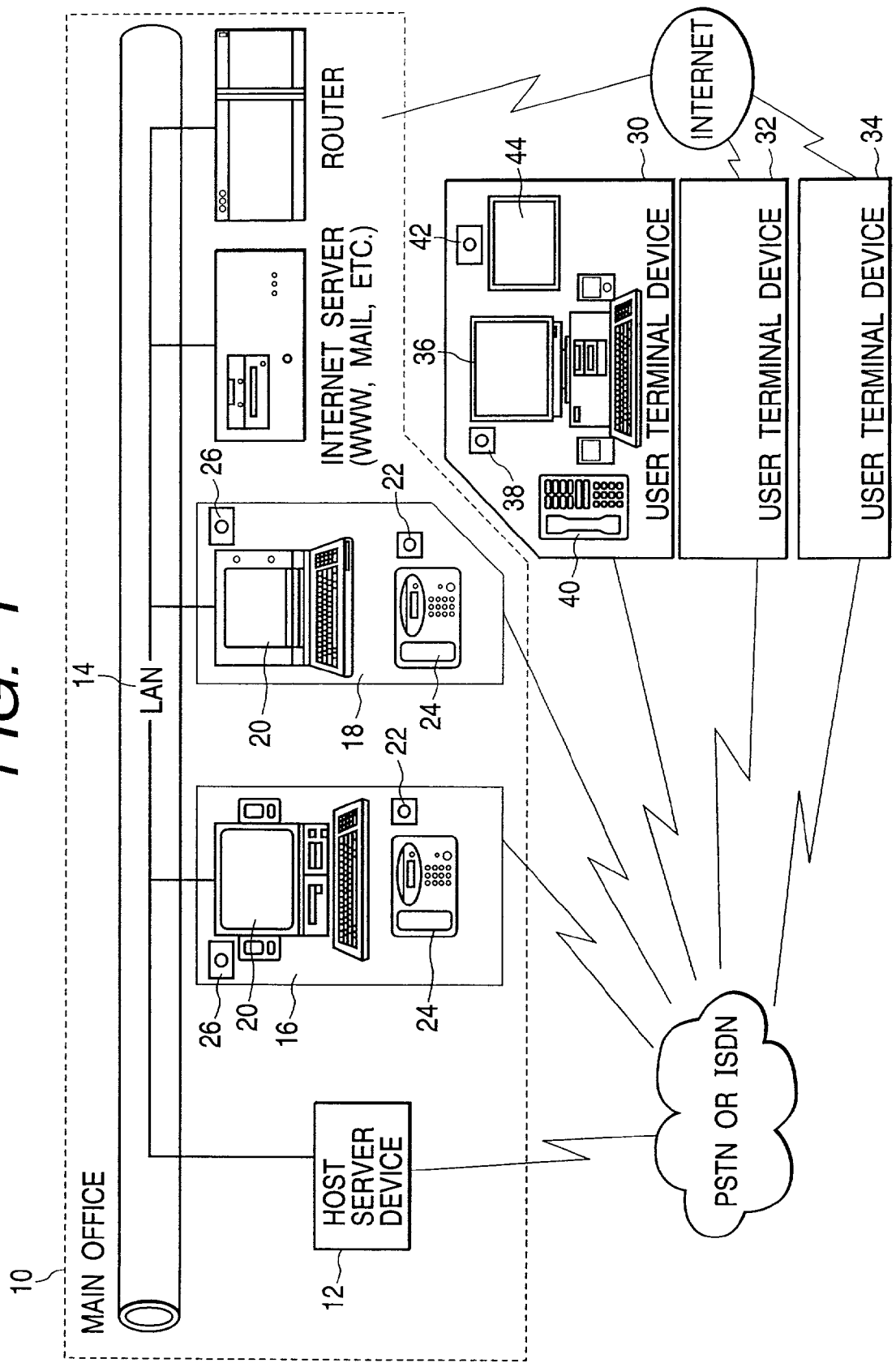
FIG. 1 is a schematic structural block diagram according to an embodiment of the present invention.

FIG. 1 is a schematic structural block diagram of a virtual office system being an embodiment of the present invention. In a main office (head office of various organizations such as a company, a corporation and the like introducing dispersive office style) 10, a host server device 12 is located. The host server device 12 is connected to a LAN (Local Area Network) 14 in the main office 10. User terminal devices 16 and 18 to be used by workers worked in the main office 10 can be functioned by combining a computer 20, a user terminal device software 22, a telephone 24, a video camera 26 and other equipments. The telephone 24 can be connected to the host server device 12 through a PSTN (Public Switched Telephone Network) line or an ISDN line. The computer 20 is connected to the host server device 12 through the LAN 14.

User terminal devices 30, 32 and 34 to be used by a user worked in a home office can be functioned by combining a computer 36, a user terminal device software 38, a telephone 40, a video camera 42, a virtual office display unit 44 and other equipments. The telephone 40 can be connected to the host server device 12 through the PSTN line or the ISDN line. The virtual office display unit 44 is connected to the computer 36.

Figure 2:
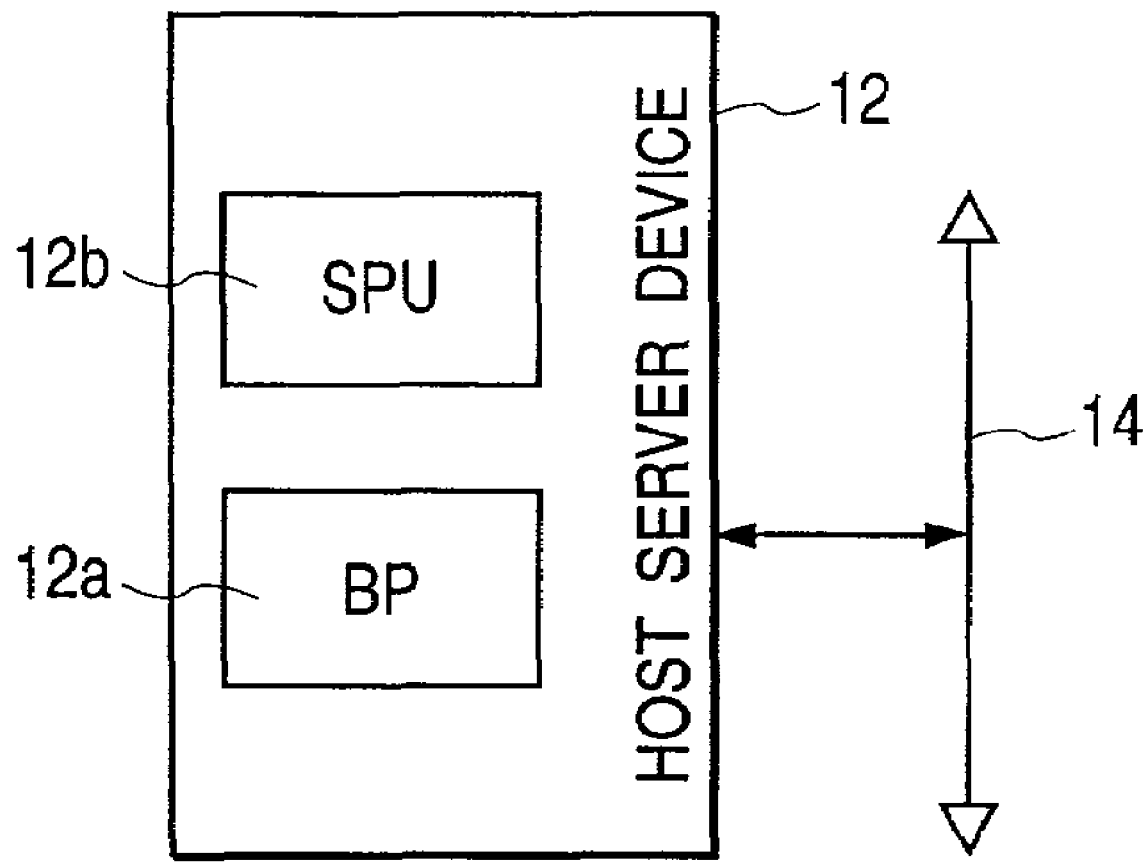
FIG. 2 is a view showing hardware structure of a host server device 12.

FIG. 2 shows an example of hardware structure of the host server device 12. A BP (Basic Platform) 12a is composed of a PC host server device. An SPU (Signal processing Unit) 12b is a signal processing board composed of a high-performance DSP (Digital Signal processor) or the like. The SPU 12b is utilized in processing a signal such as an image signal, a voice sound signal or the like at a server side. The BP 12a is connected to the LAN 14 in the main office 10 through a LAN board. The structure itself as mentioned above is known and another known structure can be adopted.

Figure 3:
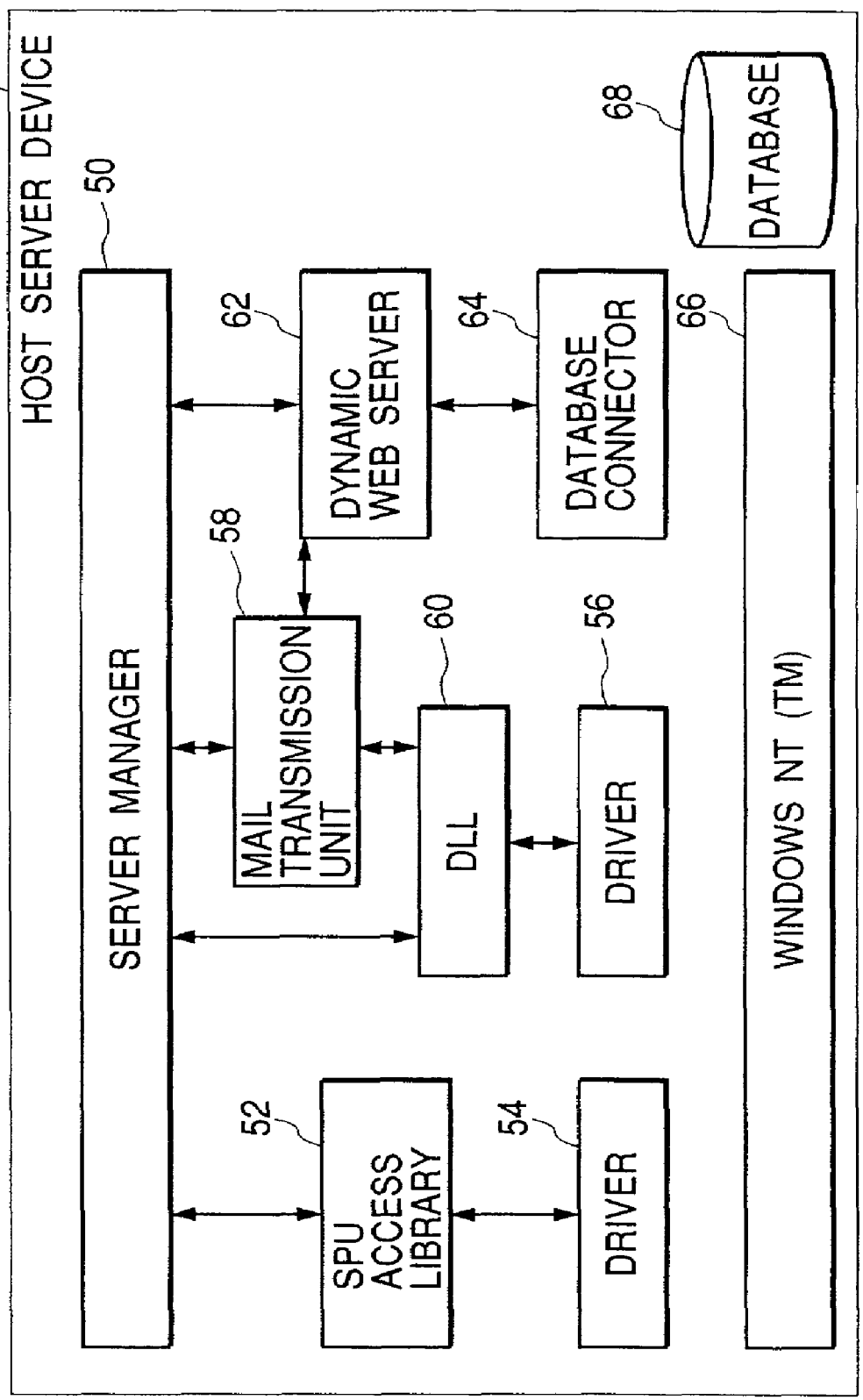
FIG. 3 is a view showing software structure of the host server device 12.

FIG. 3 is a schematic structural block diagram of software structure of the host server device 12. The software to be installed in the host server device 12 includes a software program developed by use of the C++ language or the like and a conventional software program, and Windows NT (trademark of Microsoft, U.S.A.) is adopted as an OS (Operating System). In FIG. 3, numeral 50 denotes a server manager, numeral 52 denotes an SPU access library, numerals 54 and 56 denote drivers, numeral 58 denotes a mail transmission unit, numeral 60 denotes a DLL (Dynamic Link Library), numeral 62 denotes a dynamic web server, numeral 64 denotes a database connector, numeral 66 denotes the Windows NT (registered trademark of Microsoft, U.S.A.) and numeral 68 denotes a database.

Figure 4:
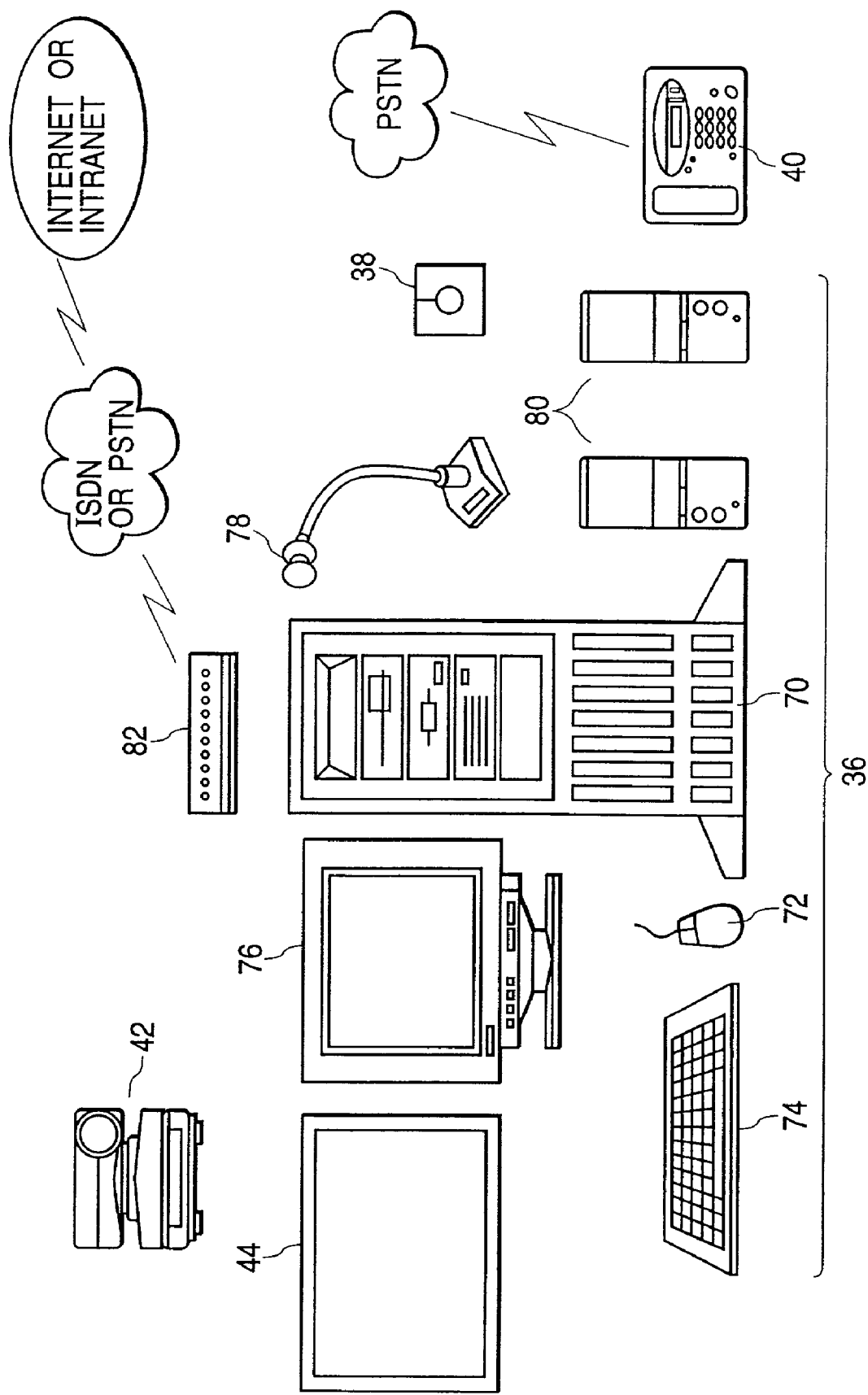
FIG. 4 is a view showing equipment structure of user terminal devices 30, 32 and 34.

FIG. 4 shows an example of hardware structure of the user terminal device 30. As already known, the computer 36 is composed of a main body 70, a mouse 72, a keyboard 74, a display 76, a microphone 78, a speaker 80 and a MODEM 82 (or terminal adaptor). The virtual office displaying unit 44 composed of a similar video monitor device as compared with that of the display 76 is connected to the main body 70 and is used for displaying a virtual office screen.

Figure 5:
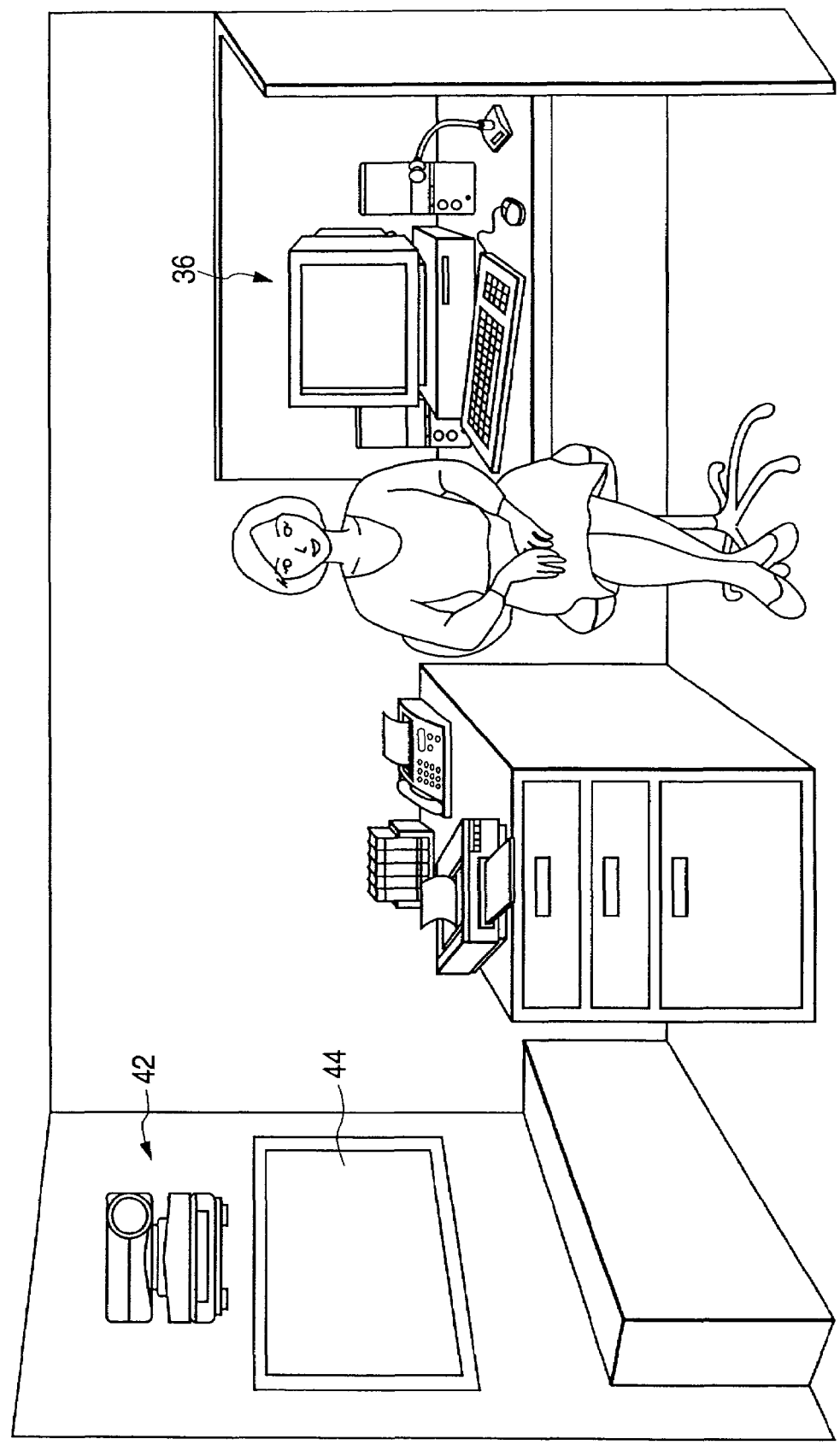
FIG. 5 is a view showing an arrangement example of the user terminal devices 30, 32 and 34.

FIG. 5 shows an example of setting state of the equipments shown in FIG. 4 in the home office. In this home office, the virtual office display unit 44 is located on a place different from a place of the display 76 of the computer 36 to be used by the user in performing operations.

Next, an operation of the present embodiment will be described. To simplify the description, it is assumed that each user at the home office has already finished to connect the user terminal devices to the host server device 12 by operating the own user terminal devices 30, 32 and 34 and has started to work.

Figure 6:
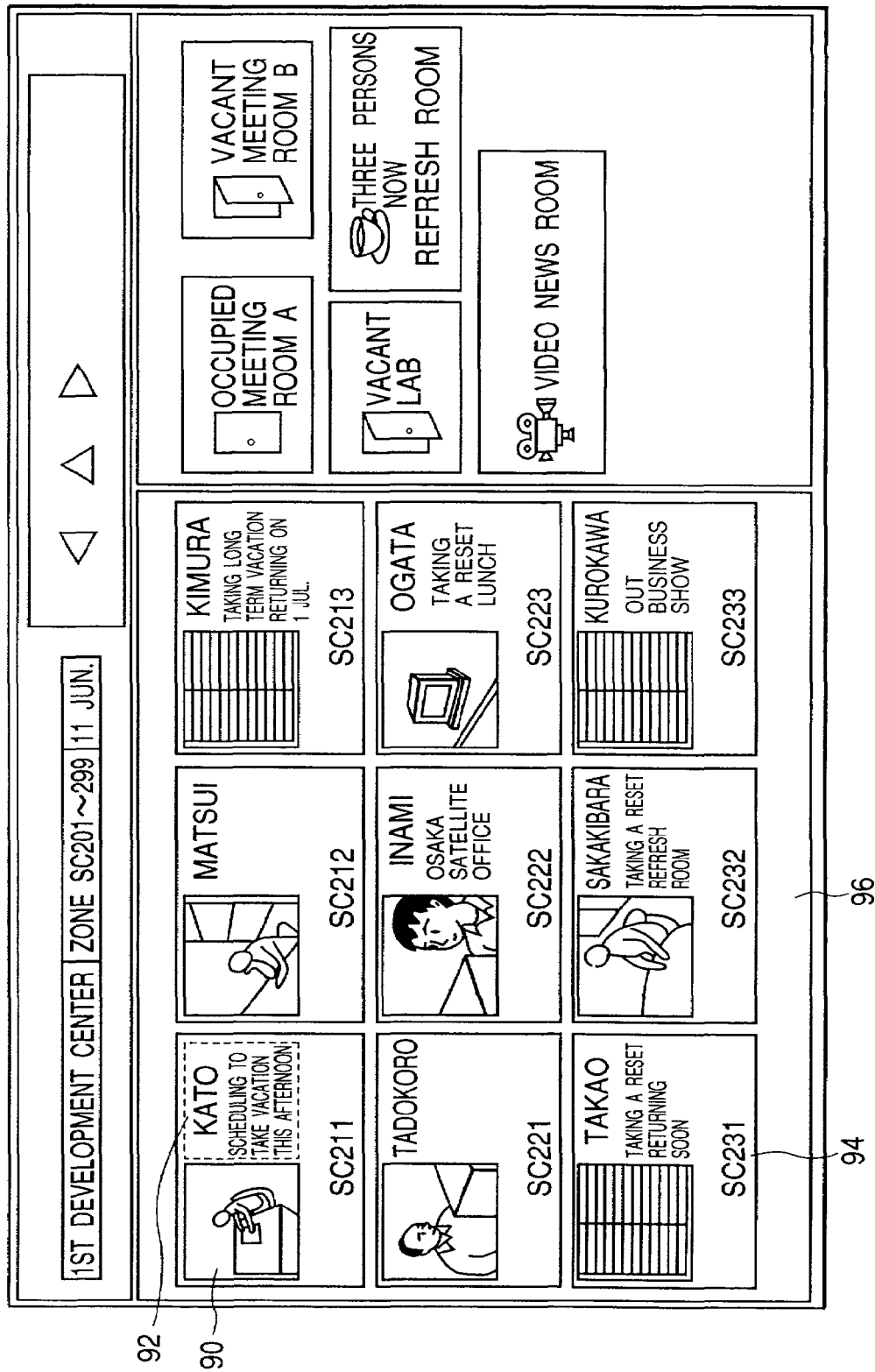
FIG. 6 is a view showing a screen example called an office view displayed on a virtual office display unit 44.

FIG. 6 shows a screen called an office view to be displayed on the virtual office display unit 44. Numeral 90 denotes an image which indicates working status of another user. Numeral 92 denotes a working status data display portion for displaying the user's name and working status data of the user by character information. Numeral 94 denotes a private room office space of the user. Substance obtained by totalizing the above three factors is a virtual private room office of the user. In FIG. 6, nine private room offices are display on the same screen. However, the number of the private room offices may be more than or less than nine. A space for displaying these private room offices is called a private room office area 96. A space between the private room office and the adjoining private room office is a virtual corridor portion. The user working status image 90 being displayed as a part of the private room office is an image taken by the video camera 42 provided on the user terminal device to be used by the user. As indicated by user working status images of SC213, SC231 and SC233, when the camera 42 does not operate, images are not displayed.

Generally, in a case where the user is working, the office view as shown in FIG. 6 is displayed on the virtual office display unit 44.

Figure 7:
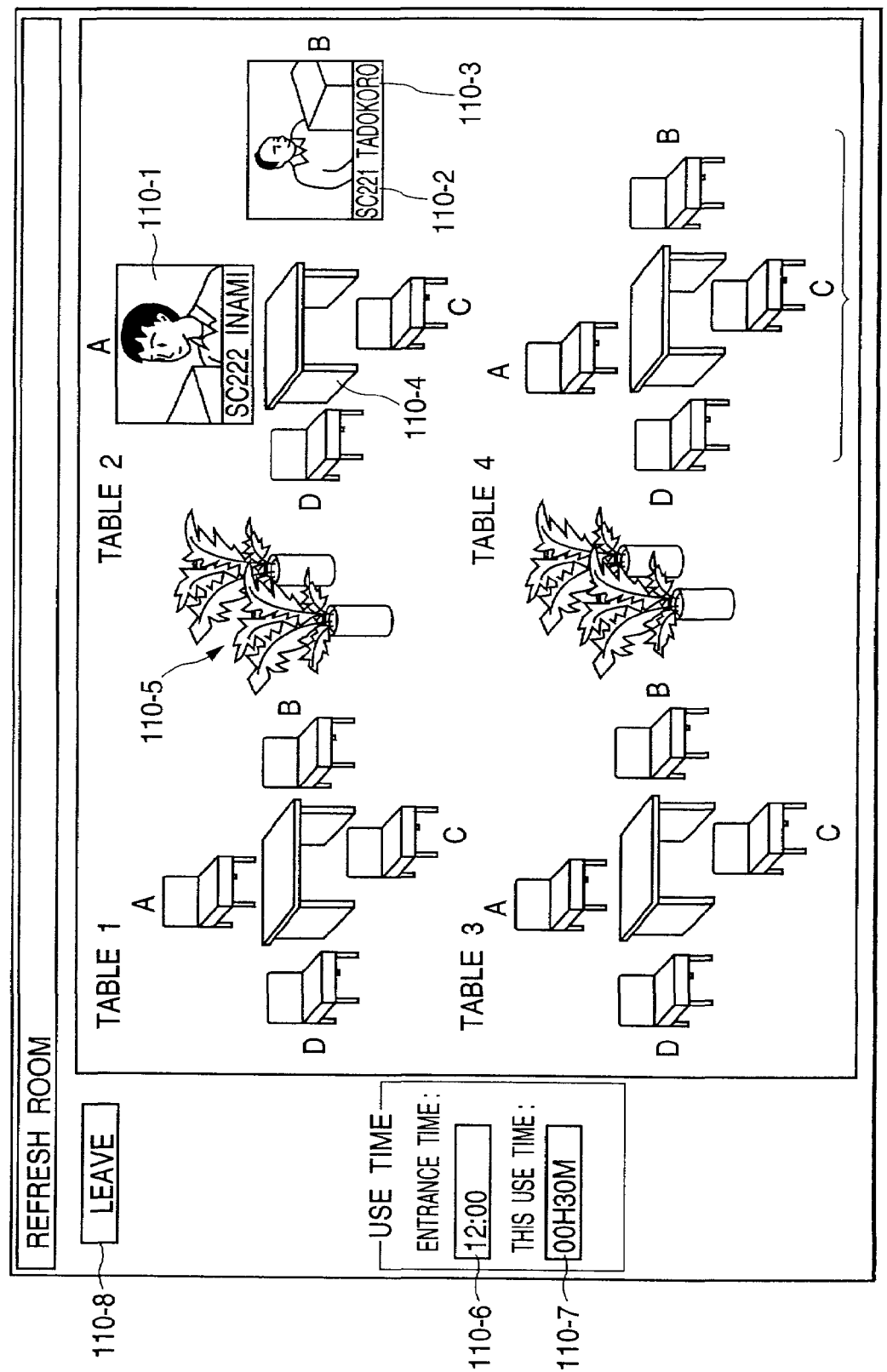
FIG. 7 is a view showing a screen example called a refresh room view displayed on the virtual office display unit 44.

FIG. 7 shows an example of a screen on the virtual office display unit 44 called a refresh room view. In this example, independent four refresh corners are simultaneously displayed on the same screen. Only fellow users sit down on the same refresh corner can communicate with each other using a rest tool. Numeral 110-1 denotes an image obtained by imaging another user and this image is taken by a camera provided on the user terminal device to be used by the user. In a lower portion of the each user image 110-1, a user ID 110-2 and a name 110-3 of the user are consecutively displayed. An image 110-4 reproducing a desk scene indicates a virtual place wherein a cooperative rest tool can be put on the desk. Numeral 110-5 denotes a decorative image. A virtual rest room provided by the organization such as a company or the like, to which the workers are belonged, is displayed as described above. In FIG. 7, the four refresh corners are displayed on the same screen and four workers can be seated in one refresh corner. However, the number of the refresh corners or the workers may be more than or less than four.

The image 110-4 reproducing the desk scene and the decorative image 110-5 are previously registered and stored in the host server device 12 and are properly transferred to the user terminal devices 30, 32 and 34 to be displayed on a screen of the refresh room view on the virtual office display unit 44 as shown in FIG. 7.

The users sat down on the same table can select the cooperative rest tool capable of realizing the informal communication and the rest. The cooperative rest tool in this embodiment includes three kinds of tools, that is, a voice meeting tool (also called voice chat tool) and a character meeting tool (also called text chat tool) and a multiuser game tool. Any of these tools can be realized to operate by the known technology.

For example, the voice meeting tool enables the each user to perform a voice meeting/chat among plural places by using the microphone 78 and the speaker 80 of the each user terminal device upon starting both a voice meeting client software (voice telephone client software for TCP/IP network conforming to ITU-T Standard H.323) installed to the user terminal device and a voice meeting server software (plural points voice telephone meeting server software for TCP/IP network conforming to ITU-T Standard H.323) installed to the host server device 12.

The character meeting tool enables the each user to perform a character meeting/chat by inputting characters using a keyboard while reading a text chat window displayed on the display 76 of the each user terminal device or a text chat window (to be simultaneously displayed on a window different from a refresh room display screen) displayed on the virtual office display device 44 upon starting both a character meeting client software (character meeting client software for TCP/IP network conforming to IRC (Internet Relay Chat) standard) installed to the user terminal device and a character meeting server software (plural points character meeting server software for TCP/IP network conforming to IRC standard) installed to the host server device 12.

The multiuser game tool enables the each user to perform a game with the multiuser by utilizing a multiuser game window to be displayed on the display 76 of the each user terminal device, the mouse 72 and the keyboard 74 upon starting both a multiuser game client software (plural points communication game software for TCP/IP network) installed to the user terminal device and a multiuser game server software (multiuser game server software for TCP/IP network) installed to the host server device 12.

Since the voice meeting tool, the character meeting tool and the multiuser game tool are based on the known technology and the description is merely an example of utilizing explanation, more description will be omitted. During an elapse of time while the users at the plural user terminal devices cooperatively uses these tools, a software 38 for the user terminal device is simultaneously operated. Therefore, the user can continuously look an image of updating the working status of another user. A time when the user come in the refresh room is displayed on an entrance time display section 110-6 and a time during the user's stay in the refresh room is displayed on a use time display section 110-7. The user can return to the virtual office shown in FIG. 6 at any time by pushing a leave button 110-8 using a mouse pointer.

Figure 8:
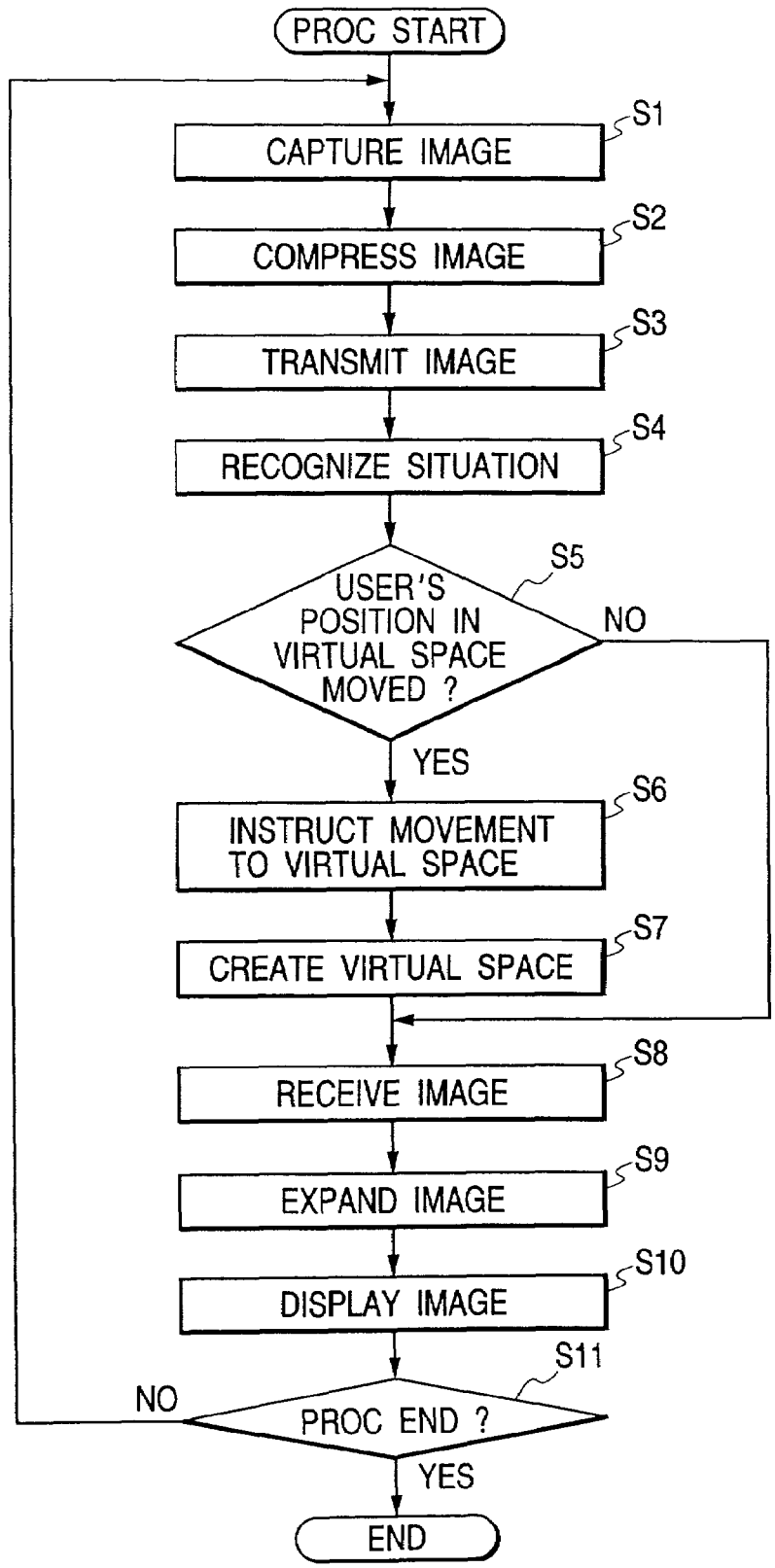
FIG. 8 is a flow chart of a first operation according to the present embodiment.

A control operation of the virtual office in this embodiment will be described with reference to a flow chart shown in FIG. 8. FIG. 8 is a flow chart of operations of obtaining and displaying image data of the user's side terminals being clients and controlling a virtual space.

An image taken by the each video camera is inputted to the computer main body 70 through a video input unit of the computer main body 70 to be captured as digital image data of a QCIF format (176×144 pixels) (step S1). The captured image data is compressively encoded according to an image encoding system such as a JPEG system or an H.263 system (step S2). The encoded data is immediately transferred to the host server device 12 through a network (step S3).

The computer main body 70 recognizes pose of the user on the basis of the taken image (step S4). The recognition of pose can be realized by detecting a face area using, for example, a proposal by Yokoo and Hagiwara "Plural Face Areas Extraction Out of Natural Images Using Genetic Algorithm" A Publication of Industry Applications Society of IEEJ (The Institute of Electrical Engineers of Japan), 117-C, 9, pp. 1245–1252, 1997 and judging a face direction on the basis of the extracted face area through a neural network or the like. As to a detection of the face direction, a method proposed in "Identifying Image of Figure—Computer Vision For Human Interface", Suenaga, IEICE (The Institute of Electronics, Information and Communication Engineers) Transactions, pp. 800–804, 1995/8, or the like may be used.

On the basis of information obtained from the pose recognition result, it is judged whether or not a user's position in the virtual space is to be moved (step S5). A judgment processing unit has histories regarding the past judgment result of image frames and determines movement to the virtual space if it was judged that the user continuously looked toward the virtual office display device 44 for a period longer than a time previously determined by the user (step S5). In case of determining the movement, data of the refresh room view is obtained instead of data of the office view from the host server device 12 to create the refresh room view on a screen of the virtual office display device 44 (steps S6 and S7).

The user terminal device of that user receives image data of another user stays in the refresh room from the host server device 12 (step S8) and displays it on the virtual office display device 44 (step S10) after executing expansion processing (step S9). If an instruction of processing end is not given from the user (step S11), a flow returns to the step S1, and if it is instructed, the processing is ended.

The user recognizes another user stays in the refresh room view and can communicate with the another user utilizing the prepared tool.

In this embodiment, since the screen is automatically switched to a virtual rest room screen when the user looks toward the virtual office display device 44 for the period longer than the time previously determined by the user, it becomes possible to take an accidental informal communication with another user stays in that virtual rest room.

Figure 9:
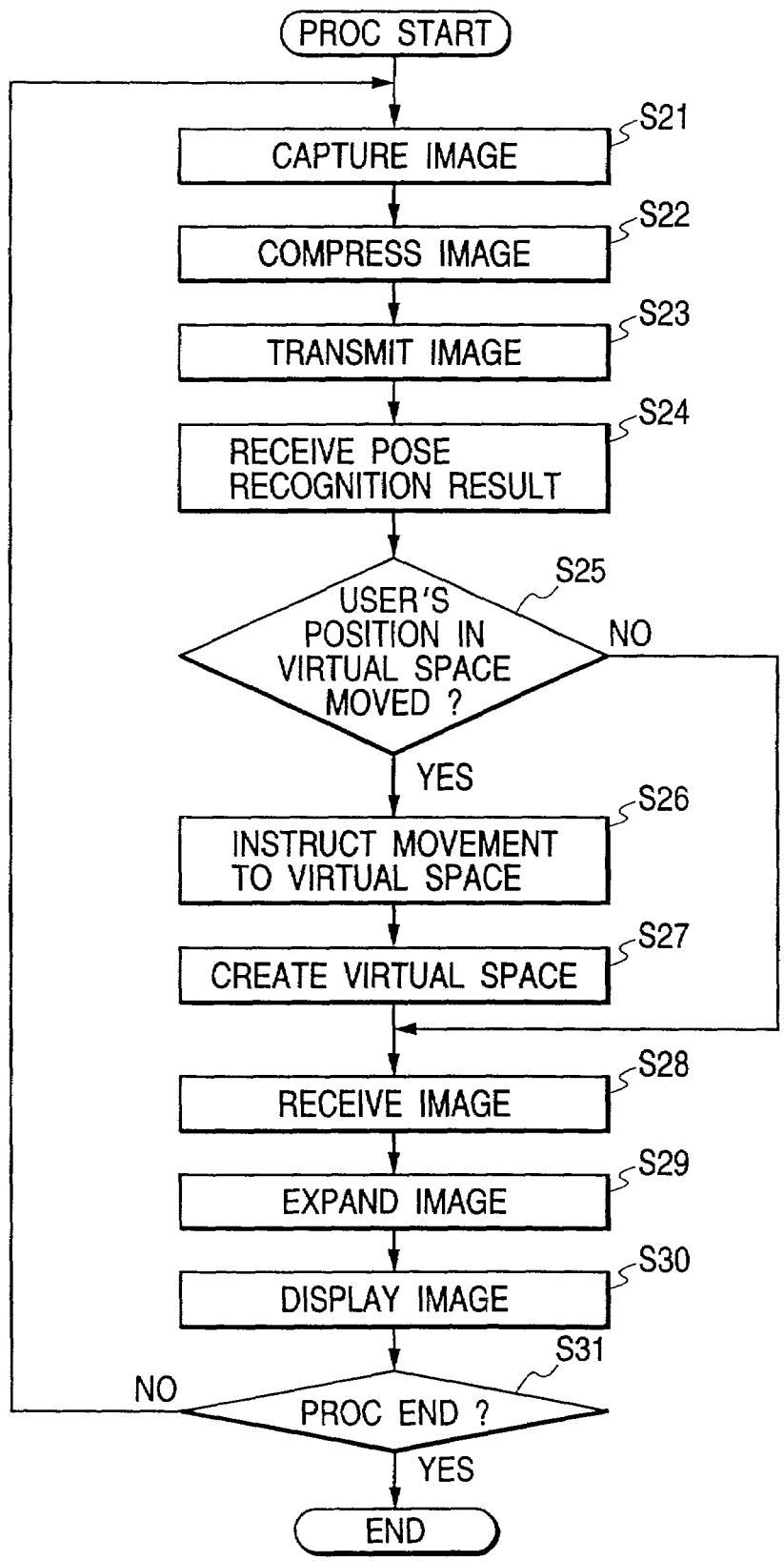
FIG. 9 is a flow chart of an operation in a client according to a second operation example.
Figure 10:
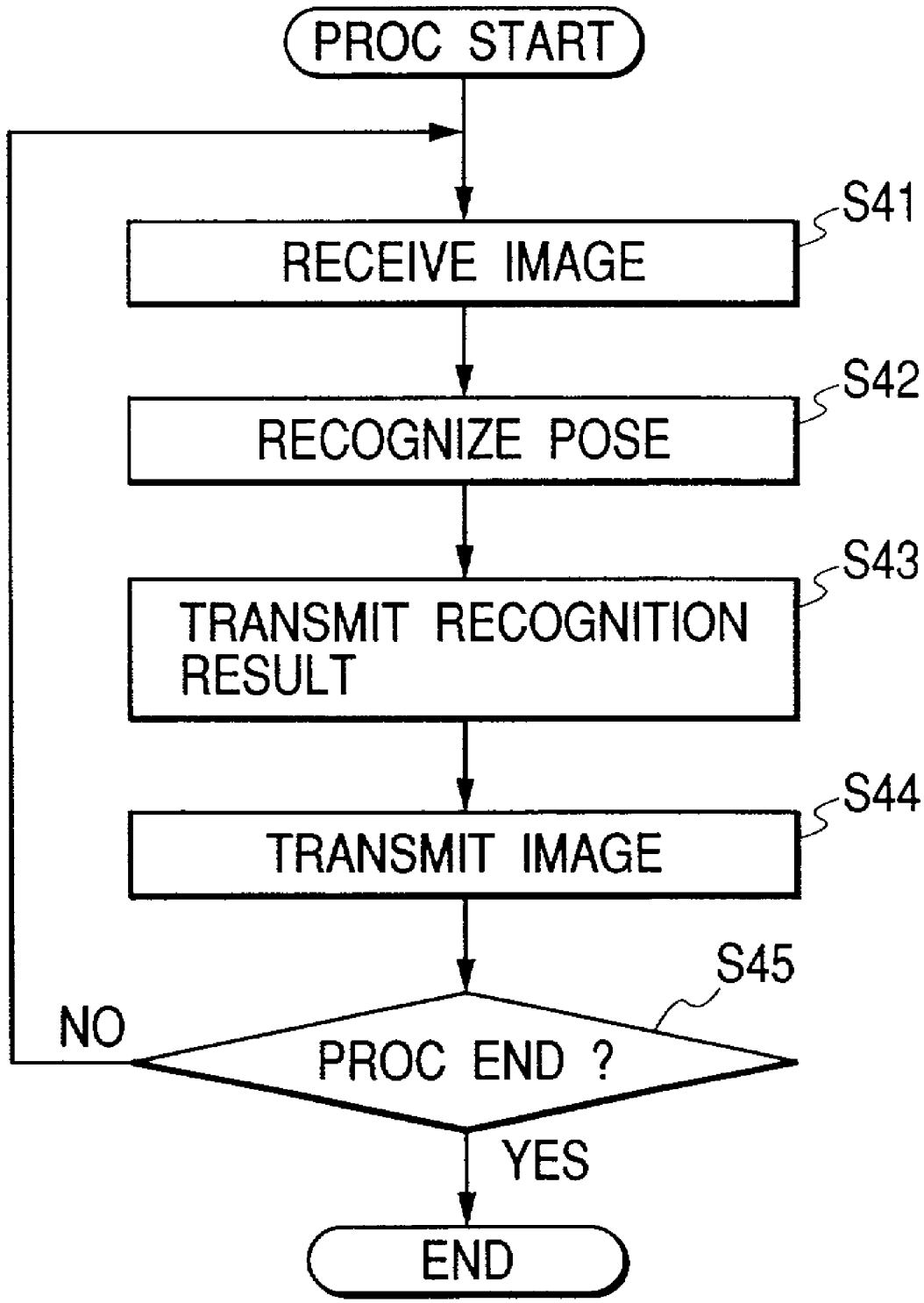
FIG. 10 is a flow chart of an operation in a host server device 12 according to the second operation example.

Next, another operation example between the host server device 12 and the user terminal devices 30, 32 and 34 will be described. FIG. 9 is a flow chart of operations of obtaining and displaying image data of the user's side terminal devices 30, 32 and 34 being the clients and controlling the virtual space. FIG. 10 is a flow chart of operations of recognizing the pose and distributing images performed in the host server device 12.

An image taken by the each video camera is inputted to the computer main body 70 through a video input unit of the computer main body 70 to be captured as digital image data of a QCIF format (176×144 pixels) (step S21). The captured image data is compressively encoded according to an image encoding system such as the JPEG or the H.263 (step S22).

The encoded data is immediately transferred to the host server device 12 through a network (step S23).

The host server device 12 receives the image data transmitted from the user terminal devices 30, 32 and 34 (step S41) and recognizes the pose of the user, that is, the face direction of the user on the basis of the reception image data by the DSP in the SPU 12b (step S42). The recognition result data is transmitted to the corresponding user terminal device 30, 32 or 34 (step S43).

The user terminal devices 30, 32 and 34 judge whether or not the user's position in the virtual space is to be moved on the basis of information obtained from the pose recognition result recognized by the host server device 12 (step S25). The judgment processing unit has histories of the past judgment result and determines movement to the virtual space if it was judged that the user continuously looked toward the virtual office display device 44 for a period longer than a time previously determined by the user (step S25). In case of determining the movement (step S25), data of the refresh room view is obtained instead of data of the office view from the host server device 12 to create the refresh room view on a screen of the virtual office display device 44 (steps S26 and S27).

The user terminal device of that user receives image data of another user stays in the refresh room from the host server device 12 (step S28) and displays it on the virtual office display device 44 (step S30) after executing expansion processing (step S29). If an instruction of processing end is not given from the user (step S31), a flow returns to the step S1, and if it is instructed, the processing is ended.

Also, in this embodiment, the user recognizes another user stays in the refresh room view and can communicate with the another user utilizing the prepared tool. Further, processing load on the user terminal devices 30, 32 and 34 can be reduced by causing the host server device 12 to execute processing of recognizing the state of a person.

Figure 11:
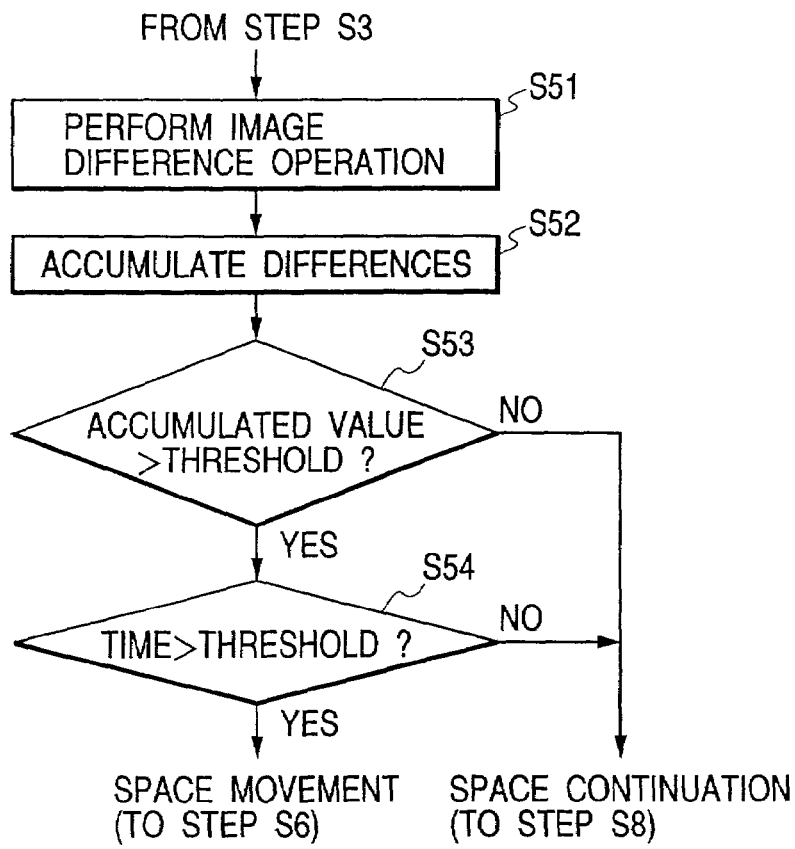
FIG. 11 is a flow chart of a modified portion of a third operation example.

In the above embodiment, the virtual space is controlled on the basis of the result of recognizing the pose of the user. However, the virtual space may be controlled on the basis of the result of recognizing concentration of the user. A modified example thereof will be described. More particularly, processing in the steps S4 and S5 shown in FIG. 8 is changed to that shown in FIG. 11.

Difference data between images is calculated with reference to plural image frame data sequentially continued with the elapse of time (step S51), and an obtained difference value is accumulated for a predetermined time. (Step S52). An obtained accumulated result is compared with a predetermined threshold value so as to judge the concentration (step S53). That is, in a case where a difference accumulated value within the predetermined time is less than the threshold value, the motion is in an inactive state. Consequently, it is judged that a target person is in a concentrating state. A time judged as a period of concentrating state is accumulated, and if the accumulated time exceeds a previously instructed threshold value (step S54), it is instructed to move to the refresh room such that the user is compelled to take the rest.

In this manner, in a case where the user concentrates the work for a long time, the user is automatically moved to a virtual rest room in the virtual space to make the user take the rest. At this time, it is possible to make the user has a chance of taking the accidental informal communication with another user stays in that rest room.

Figure 12:
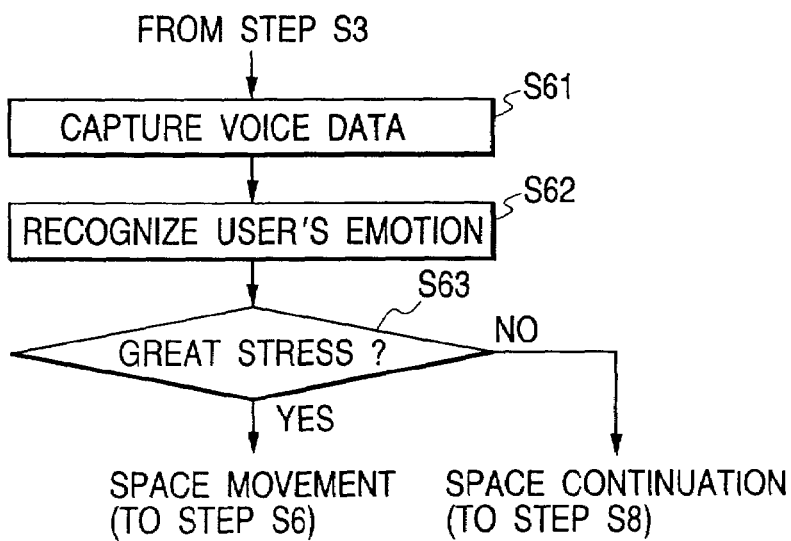
FIG. 12 is a flow chart of a modified portion of a fourth operation example.

In the above embodiment, the virtual space is controlled in accordance with the image recognition result. However, the virtual space may be controlled in accordance with a result obtained by recognizing user's emotion utilizing voice sound. FIG. 12 is a flow chart of substitutive processing in the steps S4 and S5 shown in FIG. 8.

Voice sound data of the user is captured to the computer main body 70 from the microphone 78 or the telephone 40 to be used by the user (step S61), and the user's emotion is recognized based on the captured voice sound data (step S62). For example, according to methods disclosed in Japanese Patent Application Laid Open Nos. 5-012023 and 9-81632, the emotion can be recognized on the basis of the voice sound data. If it is judged that the user is in a great stress condition (condition of anger, impatience, irritation, uneasiness or the like) in accordance with the recognition result (step S63), the user is compelled to be moved to the refresh room for taking the rest.

In this manner, in a case where the user performs the work with the great stress condition, the user is automatically moved to the virtual rest room in the virtual space to make the user take the rest. At this time, it is possible to make the user has a chance of taking the accidental informal communication with another user stays in that rest room. Accordingly, the stress can be reduced.

Although an embodiment for realizing various functions using software on a general-purpose computer by providing the virtual office display device 44 besides a display unit of a computer was described, the present invention is not limited to this case. For example, the various functions may be realized by the constitution of independently connecting the display device 44 structured as a self-supporting private terminal to a network. In this case, the camera 42 is directly connected to the display device 44, which entirely executes various processing such as signal processing and communication processing.

As the pose recognition of a person, a method of judging from not only the face direction but also an overall pose of the upper body of a person may be adopted.

With respect to judgment processing of the movement in the virtual space, a method of judging from not only a totalized time of looking toward the virtual office display device 44 but also the number of times (frequency) of looking toward the virtual office display unit 44 may be used in judgment.

The processing executed by the host server device is not limited to the pose recognition. The processing shown in FIGS. 11 and 12 may be executed by the host server device 12. Consequently, the load on the user terminal devices can be reduced in any case.

Although a method of judging the concentration on the basis of user's motion extracted from an image data difference value was described, the method of judging the concentration of the user is not limited to this method. For example, the concentration can be judged by tracing head motion while recognizing the user's head.

The user's emotion can be discriminated by a method of recognizing face expression in accordance with image information.

As above, it is needless to say that the object of the present invention can be achieved in a case where a storage medium storing the program codes of a software for realizing the above-described embodiments is supplied to a system or an apparatus and then a computer (or CPU or MPU) in the system or the apparatus reads and executes the program codes stored in the storage medium.

In this case, the program codes themselves read from the storage medium realize new functions of the present invention, and the storage medium storing such the program codes constitutes the present invention.

The storage medium for supplying the program codes can be, for example, a floppy disk, a hard disk, an optical disk, a magnetooptical disk, a CD-ROM, a CD-R, a magnetic tape, a non-volatile memory card, a ROM, an EEPROM, or the like.

It is needless to say that the present invention also includes not only a case where the functions of the embodiments are realized by the execution of the program codes read by the computer, but also a case where an OS (operating system) or the like functioning on the computer executes all the process or a part thereof according to the instructions of the program codes, thereby realizing the functions of the embodiments.

Further, it is needless to say that the present invention further includes a case where the program codes read from the storage medium are once stored in a memory provided in a function expansion board inserted in the computer or a function expansion unit connected to the computer, and a CPU or the like provided in the function expansion board or the function expansion unit executes all the process or a part thereof according to the instructions of such program codes, thereby realizing the functions of the embodiments.

Also, the present invention is applicable to a system composed of plural equipments or to an apparatus including a single equipment.

Further, it is needless to say that the present invention is also applicable to a case of achieving the object by supplying the program to the system or the apparatus. In this case, the system or the apparatus can obtain an effect of the present invention by reading the storage medium which stores the program represented by a software for achieving the present invention for the system or the apparatus.

Further, the system or the apparatus can obtain an effect of the present invention by downloading and reading out the program represented by the software for achieving the present invention from the database on a network based on a communication program.

The present invention is not limited to the above-described embodiments, and various modifications are possible within the spirit and scope of the appended claims.

What is claimed is:

1. A control method for a home office system that includes user terminal devices each of which includes a display device, said method comprising:

a monitoring step, of monitoring whether or not a period when a concentration of a user is continuously toward the display device is longer than a predetermined time, based on an image of the user picked up by a camera; and a control step, of automatically changing a display on the display device to a display of a common virtual space for rest by informally communicating with other users when it is determined that the user should take a rest, based on a result obtained in said monitoring step that the concentration of the user is continuously toward the display device for longer than the predetermined time set by the user in advance, so that the user may informally communicate with other users present in the common virtual space for rest.

2. A computer-readable storage medium storing a program for a user terminal device of a home office system including a display device, the program comprising:

code for a monitoring step, of monitoring whether or not a period when a concentration of a user is continuously toward the display device is longer than a predetermined time, based on an image of the user picked up by a camera; and code for a control step, of automatically changing a display on the display device to a display of a common virtual space for rest by informally communicating with other users when it is determined that the user should take a rest, based on a result obtained in said monitoring step that the concentration of the user is continuously toward the display device for longer than the predetermined time set by the user in advance, so that the user may informally communicate with other users present in the common virtual space for rest.

3. A control apparatus for a virtual system, which includes plural user terminal devices and a host server device connected to the plural user terminal devices through a communication network, said control apparatus comprising:

a monitoring unit arranged to monitor whether or not a period when a concentration of a user is continuously toward the display device is longer than a predetermined time, based on an image of the user picked up by a camera; and a control unit arranged to automatically change a display on the display device to a display of a common virtual space for rest by informally communicating with other users when it is determined that the user should take a rest, based on a result obtained by said monitoring unit that the concentration of the user is continuously toward the display device for longer than the predetermined time set by the user in advance.

4. An apparatus according to claim 3, further comprising an imaging unit arranged to image the user, wherein said monitoring unit monitors a state of the user based on an image of the user outputted from said imaging unit.

5. An apparatus according to claim 4, wherein said monitoring unit monitors a face direction of the user, and said control unit moves the user to another virtual space in a case in which the user looks toward the user's user terminal device a predetermined number of times or for a predetermined time.

6. An apparatus according to claim 5, wherein the other virtual space is a space used for taking a cooperative rest.

7. An apparatus according to claim 3, further comprising an imaging unit arranged to image the user, wherein said imaging unit includes a voice sound information obtaining unit for obtaining voice sound information, said monitoring unit monitors an emotion of the user based on the voice sound information obtained by the voice sound information obtaining unit, and said control unit moves the user to another virtual space if it is judged that the user is in a stress condition, in accordance with a recognition result obtained by said monitoring unit.

8. An apparatus according to claim 3, wherein the user's user terminal device includes a transmission unit arranged to transmit information of the user to the host server device, and said monitoring unit, which is provided in the host server device, monitors a state of the user based on the information transmitted from the user's user terminal device.

* * * * *